US009413188B2

(12) United States Patent
Radke et al.

(10) Patent No.: US 9,413,188 B2
(45) Date of Patent: Aug. 9, 2016

(54) COLLAPSING ADAPTOR BATTERY CHARGER

(75) Inventors: Russell Eliot Radke, Fort Collins, CO (US); Mark David Rutherford, Wellington, CO (US)

(73) Assignee: Broadcom Corporation, Irvine, CA (US)

( * ) Notice: Subject to any disclaimer, the term of this patent is extended or adjusted under 35 U.S.C. 154(b) by 1021 days.

(21) Appl. No.: 12/246,018

(22) Filed: Oct. 6, 2008

(65) Prior Publication Data

US 2009/0091300 A1  Apr. 9, 2009

Related U.S. Application Data

(60) Provisional application No. 60/977,559, filed on Oct. 4, 2007.

(51) Int. Cl.
*H02J 7/00* (2006.01)

(52) U.S. Cl.
CPC ............. *H02J 7/0086* (2013.01); *H02J 7/0081* (2013.01)

(58) Field of Classification Search
CPC ..................................... H02J 7/00; H02J 7/04
USPC ......................................... 320/114, 160, 128
See application file for complete search history.

(56) References Cited

U.S. PATENT DOCUMENTS

| 5,739,667 | A  | * | 4/1998 | Matsuda | H02J 9/061 |
| | | | | | 320/128 |
| 6,570,746 | B1 | * | 5/2003 | Smith | H02J 7/0036 |
| | | | | | 320/127 |
| 7,834,591 | B2 | * | 11/2010 | Hussain | H01M 10/44 |
| | | | | | 320/128 |
| 7,990,106 | B2 | * | 8/2011 | Hussain | H02J 7/045 |
| | | | | | 320/128 |
| 2006/0033474 | A1 | * | 2/2006 | Shum | 320/128 |
| 2006/0119320 | A1 | * | 6/2006 | Nork et al. | 320/128 |
| 2008/0116848 | A1 | * | 5/2008 | Chen | H02J 7/0068 |
| | | | | | 320/112 |

* cited by examiner

*Primary Examiner* — Richard Isla Rodas
*Assistant Examiner* — Johali Torres Ruiz
(74) *Attorney, Agent, or Firm* — Sterne, Kessler, Goldstein & Fox P.L.L.C.

(57) ABSTRACT

A method and apparatus is disclosed to charge a battery. A wall adapter may provide a power to a battery charger in a collapsed mode of operation. In the collapsed mode of operation, the wall adapter may provide the battery charger with a collapsed power. The battery charger may provide a charging current and/or voltage in a constant current charge mode of operation and/or a constant voltage charge mode of operation using the collapsed power. When operating in the constant current charge mode of operation, the battery charger provides the charging current and/or voltage having a constant current until the voltage of the battery is less than or substantially equal to a constant charge voltage. Alternatively, when operating in the constant voltage charge mode of operation, the battery provides the charging current and/or voltage having a constant voltage until the voltage of the battery is less than or substantially equal to a float voltage.

52 Claims, 9 Drawing Sheets

COLLAPSING ADAPTOR BATTERY CHARGER

CROSS-REFERENCE TO RELATED APPLICATIONS

The present application claims the benefit of U.S. Provisional Patent Appl. No. 60/977,559, filed Oct. 4, 2007, entitled "Wall Charger," which is incorporated by reference herein in its entirety.

BACKGROUND OF THE INVENTION

1. Field of the Invention

The present invention relates generally to battery chargers, more specifically to charging a battery using a wall adapter operating in a collapsed mode of operation.

2. Related Art

Portable devices, such as smart phones, mobile computers, handheld game consoles, media recorders, media players/displayers, communication devices, and personal navigation devices (PNDs) to provide some examples, are evolving into a variety of new forms with increased functionality. Although partially offset by improvements in low-power electronics, the increase in functionality carries a corresponding increase in energy consumption causing a need for more efficient batteries and battery chargers. As a result, battery chemistries, including the more popular lithium and nickel based batteries, have seen marked improvements in performance. Although batteries continue to improve, much of their potential remains dependent on the battery charger. Accordingly, the battery charger must keep pace with battery technology in order to realize the full capabilities of such batteries.

Several different types of battery chargers are commonly used, such as linear chargers or switching chargers to provide some examples. The linear charger minimizes the size and complexity of the battery charger. The linear charger simply drops an input voltage down to a battery voltage using a pass transistor such as a MOS device or a bipolar device to provide some examples. However, the linear charger dissipates a great amount of power. For example, in the case of a 1 A linear charger, a $12V_{DC}$ input voltage, and battery voltage that varies between 4.2V and 2.5V, the power dissipation of the pass transistor can range from 7.8 W to 9.5 W. Commonly, this great amount of power is dissipated inside the portable device causing a tremendous amount of heat.

The switching charger has consistently low power dissipation over wide variations in input voltage. The switching charger steps the input voltage down to the battery voltage using one or more switching devices, such one or more MOS devices to provide an example. However, the switching charger tends to be large in size and greatly complex. Other disadvantages include electromagnetic interference (EMI) and other various electrical noises inside the portable device caused by the switching action of the charger.

Thus, what is needed is an apparatus and method to charge a battery that overcomes the shortcomings described above. Further aspects and advantages of this invention will become apparent from the detailed description that follows.

BRIEF DESCRIPTION OF THE DRAWINGS/FIGURES

The accompanying drawings illustrate the present invention and, together with the description, further serve to explain the principles of the invention and to enable those skilled in the pertinent art to make and use the invention.

Figure 6:
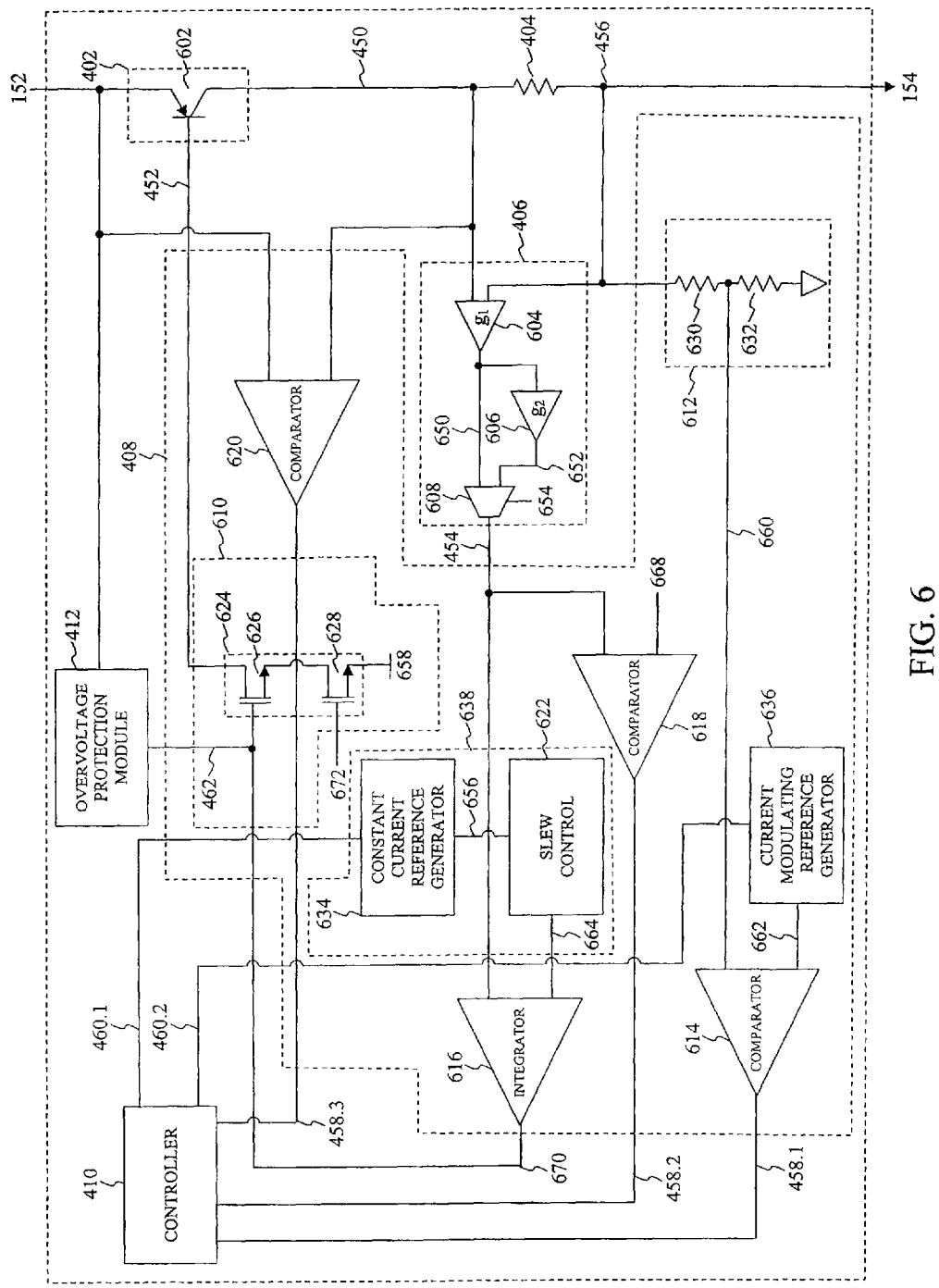

FIG. 6 further illustrates the block diagram of the battery charger used in the charging environment according to an exemplary embodiment of the present invention.

Figure 7A:
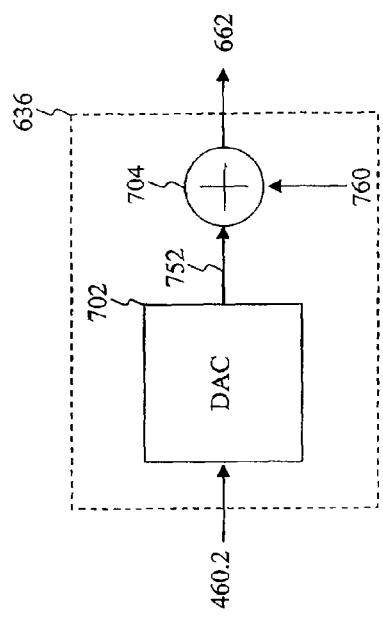

FIG. 7A illustrates a current modulating reference generator used in the battery charger according to an exemplary embodiment of the present invention.

Figure 7B:
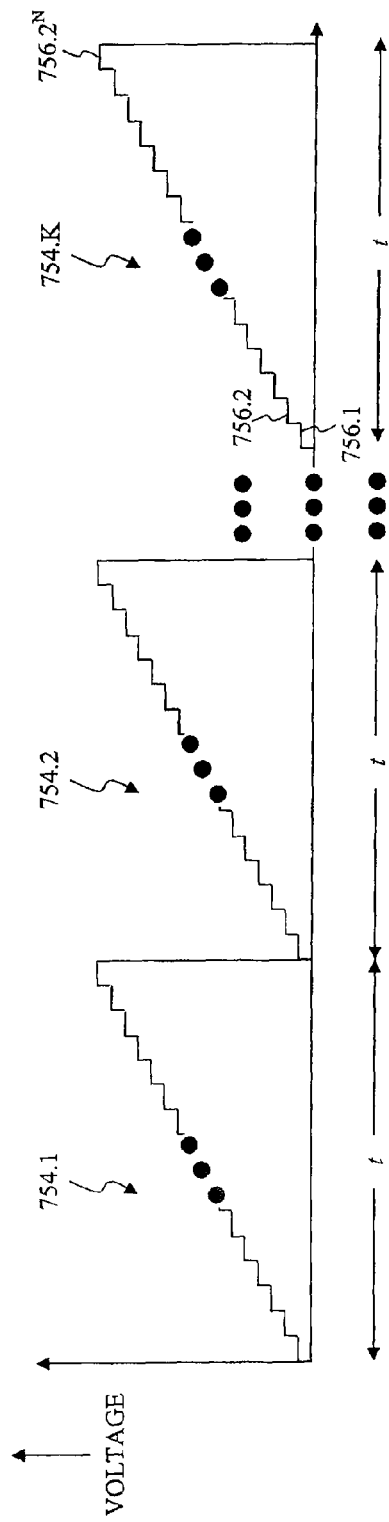

FIG. 7B illustrates a ramp signal used in the battery charger according to an exemplary embodiment of the present invention.

Figure 8:
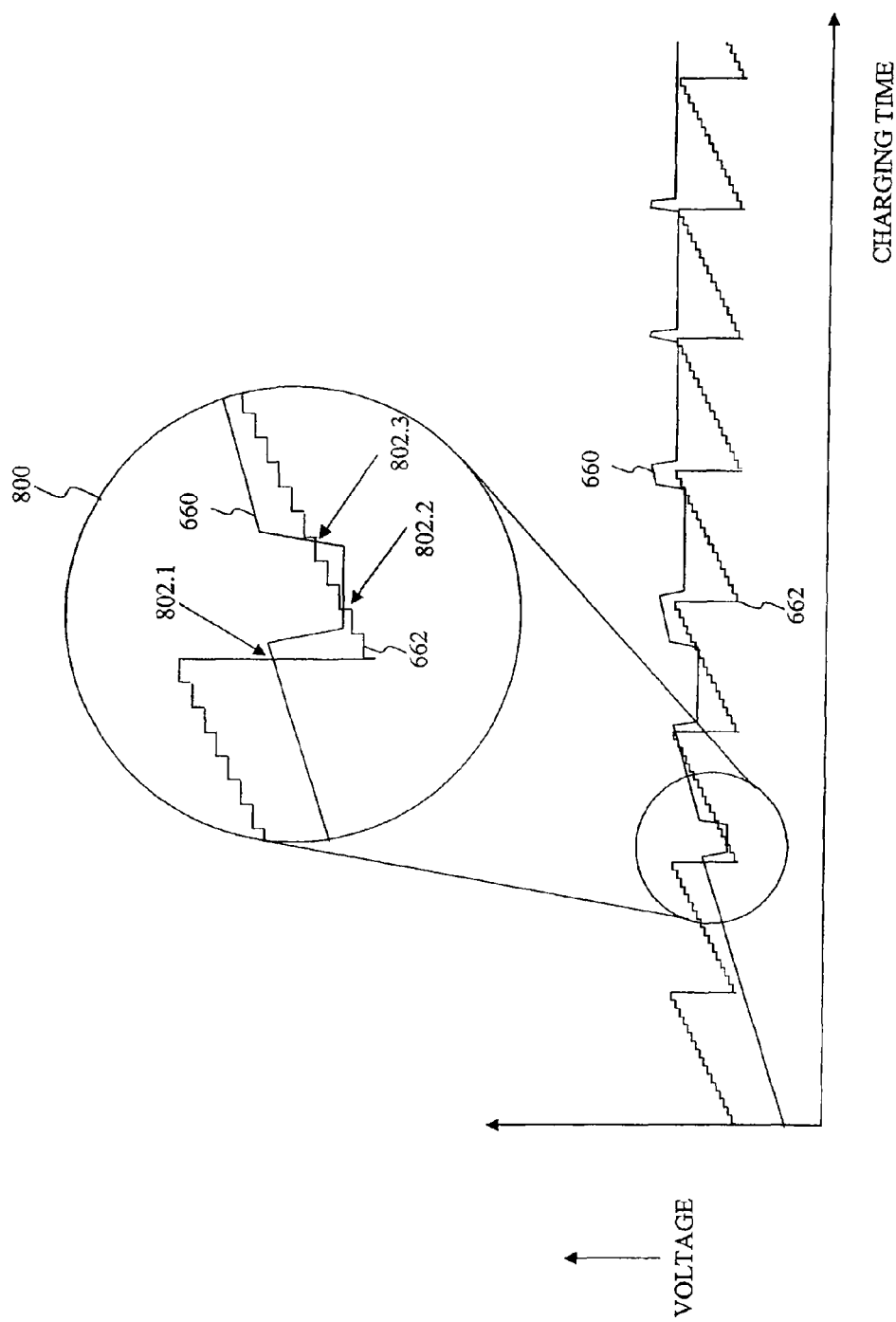

FIG. 8 illustrates an operation of a current modulating comparator used in the battery charger according to an exemplary embodiment of the present invention.

Figure 9:
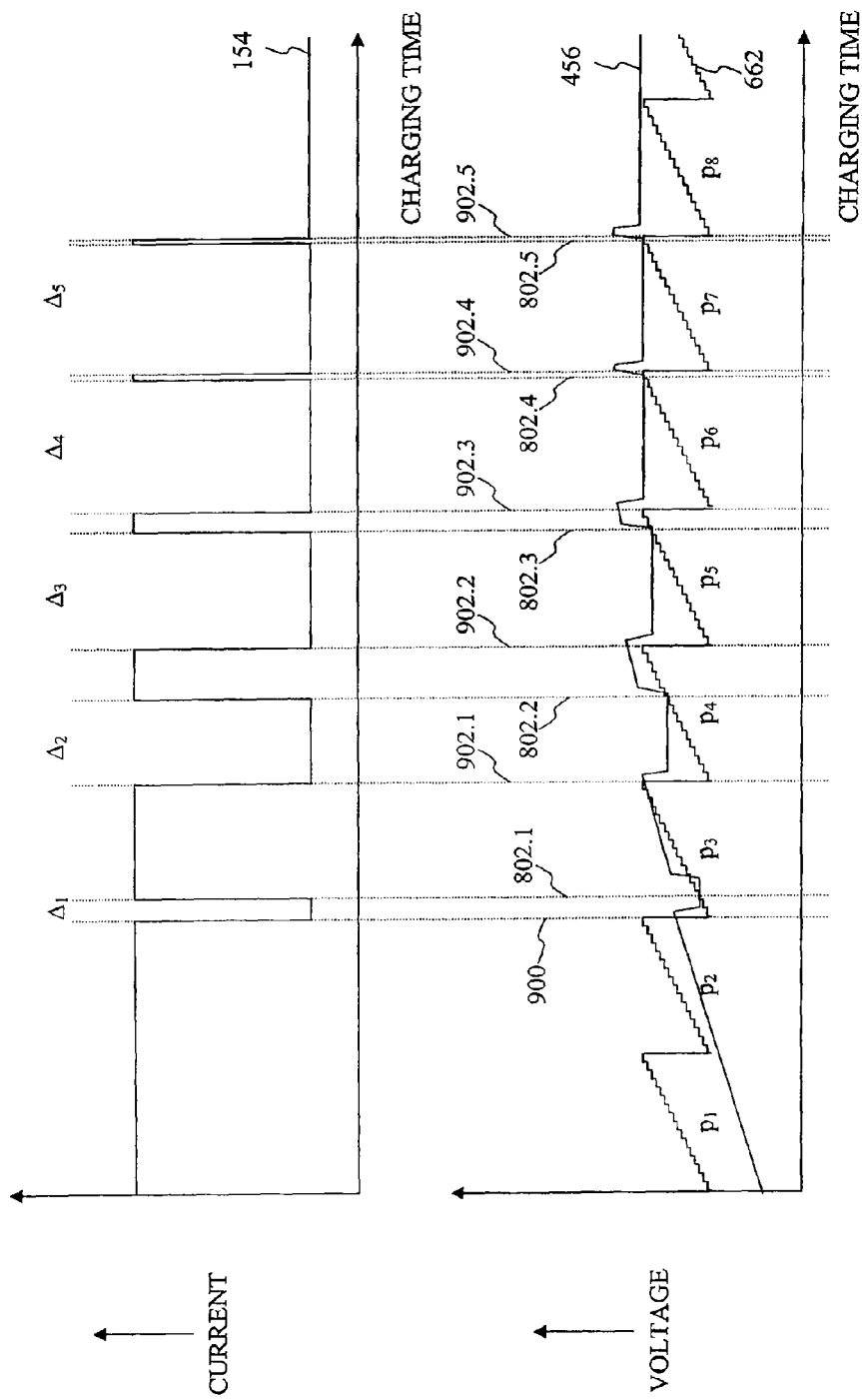

FIG. 9 illustrates an operation of the controller module used in the battery charger according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other exemplary embodiments are possible, and modifications may be made to the exemplary embodiments within the spirit and scope of the invention. Therefore, the detailed description is not meant to limit the invention. Rather, the scope of the invention is defined by the appended claims.

References in the specification to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is submitted that it is within the knowledge of those skilled in the art to effect such feature, structure, or characteristic in connection with other exemplary embodiments whether or not explicitly described.

The example exemplary embodiments described herein are provided for illustrative purposes, and are not limiting. Further structural and operational exemplary embodiments, including modifications/alterations, will become apparent to persons skilled in the relevant art(s) from the teachings herein.

Figure 1:
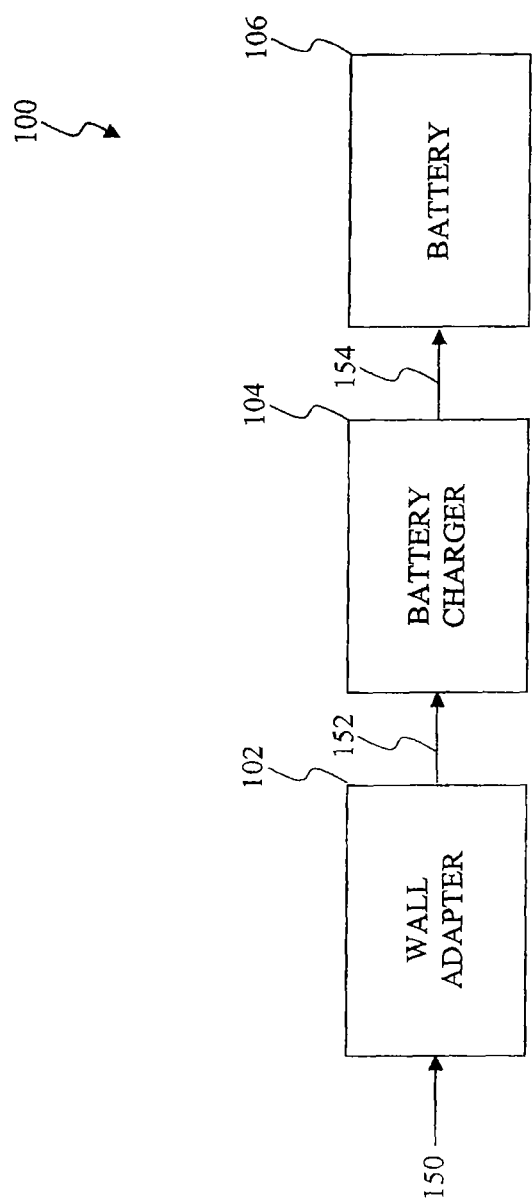
FIG. 1 illustrates a charging environment according to an exemplary embodiment of the present invention.

FIG. 1 illustrates a charging environment according to an exemplary embodiment of the present invention. A charging environment 100 includes a wall adapter 102, a battery charger 104, and a battery 106. The wall adapter 102 adapts an alternating current (AC) power 150 for use by the battery charger 104. The AC power 150 may be provided by a power receptacle located in a structure, such as a standard wall outlet to provide an example, or by any other suitable means. The AC power 150 may include an AC power in a range from $110V_{AC}$ to $120V_{AC}$ at 60 Hz corresponding to the North American standard, in a range from $220V_{AC}$ to $240V_{AC}$ at 50 Hz corresponding to the European standard, and/or any other suitable voltage and/or frequency that will be apparent to those skilled in the relevant art(s). The wall adapter 102 provides the battery charger 104 with a direct current (DC) power 152 based upon the AC power 150.

Figure 2:
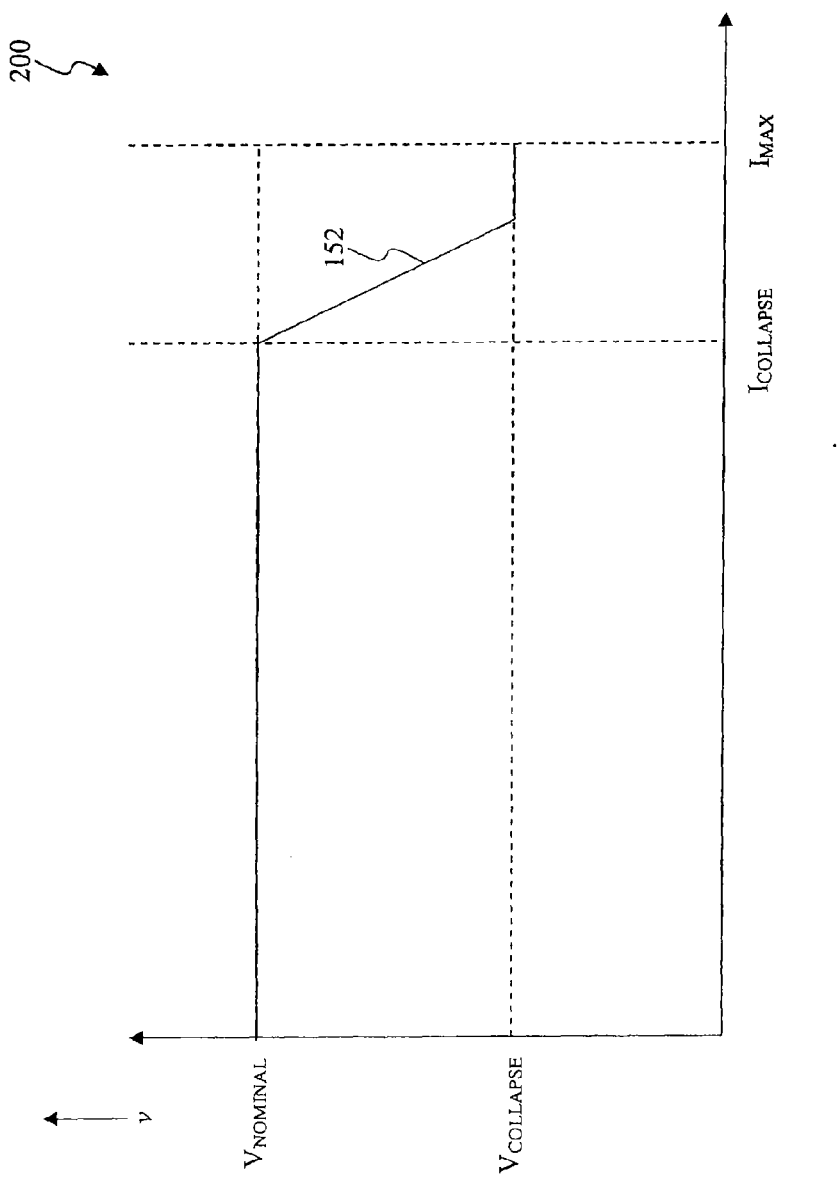
FIG. 2 illustrates an operation of a wall adapter used in the charging environment according to an exemplary embodiment of the present invention.

FIG. 2 illustrates an operation of a wall adapter used in the charging environment according to an exemplary embodiment of the present invention. However, this example is not limiting, the operation of the wall adapter as demonstrated in FIG. 2 is for illustrative purposes only. Those skilled in the relevant art(s) may operate the wall adapter differently in accordance with the teachings herein without departing from the spirit and scope of the present invention. The wall adapter 102 may provide a power, such as the DC power 152, having a voltage component and a current component, to the battery charger 104. More specifically, the wall adapter 102 may provide or source the power to the battery charger 104 in a nominal mode of operation and/or a collapsed mode of operation.

In the nominal mode of operation, the wall adapter 102 may provide the battery charger 104 with a nominal power, having a nominal voltage component, denoted as $V_{NOMINAL}$, and a range of current components less than a collapsing current, denoted as $I_{COLLAPSE}$ For example, the wall adapter 102 may be implemented to provide the nominal voltage $V_{NOMINAL}$ of $10V_{DC}$ and the collapsing current $I_{COLLAPSE}$ of 950 mA. In this example, the wall adapter 102 may provide the battery charger 104 with the nominal power having the nominal voltage $V_{NOMINAL}$ of $10V_{DC}$ and the range of current components less than 950 mA when operating in the nominal mode of operation.

Alternatively, in the collapsed mode of operation, the wall adapter 102 may provide the battery charger 104 with a collapsed power, having a collapsed voltage component, denoted as $V_{COLLAPSE}$, and a range of current components greater than the collapsing current $I_{COLLAPSE}$ but less than a maximum current, denoted as $I_{MAX}$. From the example above, the wall adapter 102 may also be implemented to provide the collapsed voltage $V_{COLLAPSE}$ of $5.2V_{DC}$ and the maximum current of 1000 mA. In this example, the wall adapter 102 may provide the battery charger 104 with the collapsed power having the collapsed voltage $V_{COLLAPSE}$ of $5.2V_{DC}$ and the range of current components greater than 950 mA but less than 1000 mA when operating in the collapsed mode of operation.

Referring again to FIG. 1, the battery charger 104 provides a battery charging current 154 to charge the battery 106 based upon the DC power 152. The battery charger 104 may operate in one or more charging modes of operation.

Figure 3:
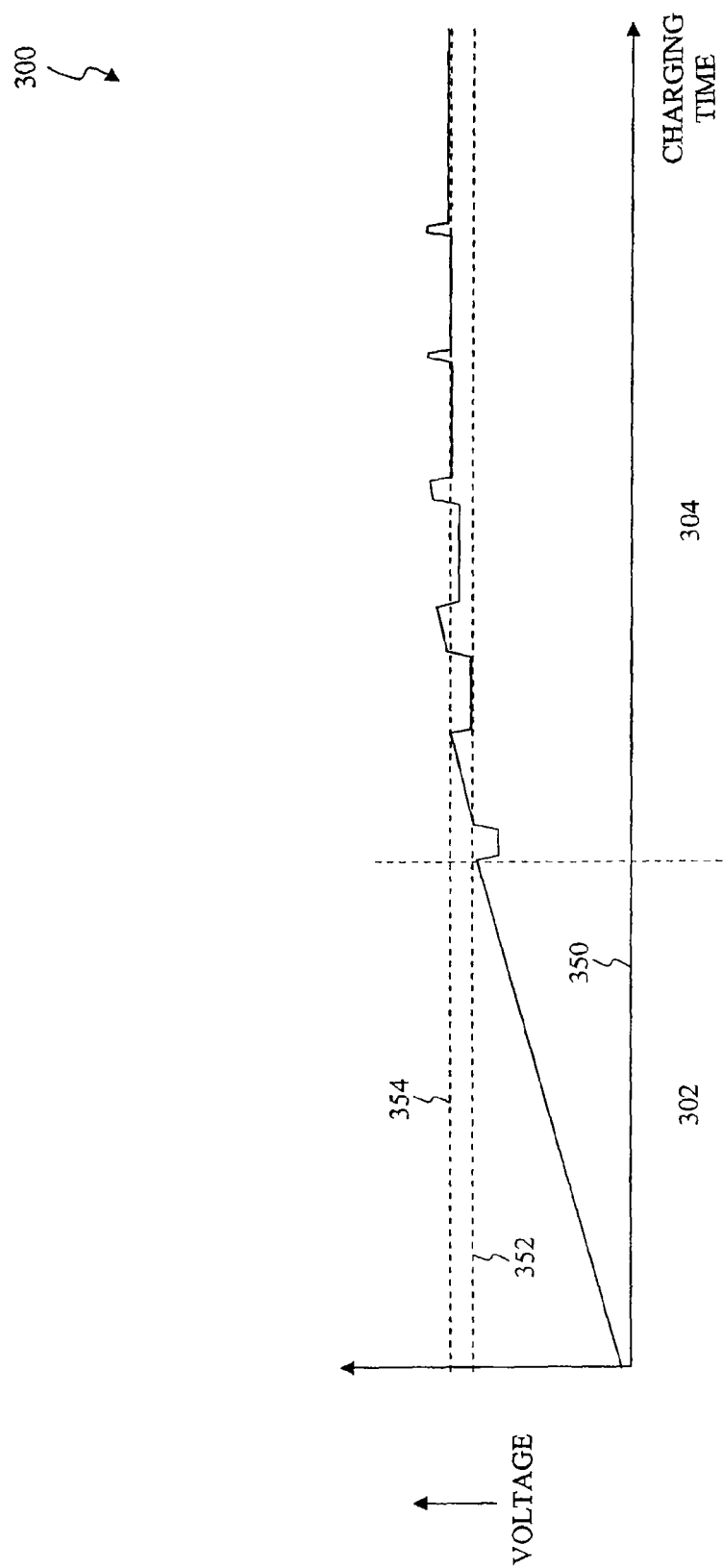
FIG. 3 illustrates one or more charging modes of operation of a battery charger used in the charging environment according to an exemplary embodiment of the present invention.

FIG. 3 illustrates one or more charging modes of operation of a battery charger used in the charging environment according to an exemplary embodiment of the present invention. However, this example is not limiting, charging modes of operation 300 of the battery charger 104 as demonstrated in FIG. 3 is for illustrative purposes only. Those skilled in the relevant art(s) may implement a greater number or a lesser number of modes of operation of the battery charger 104 differently in accordance with the teachings herein without departing from the spirit and scope of the present invention. In an exemplary embodiment, the battery charger 104 may operate in one or more of: a constant current charge mode of operation 302, and/or a constant voltage charge mode of operation 304.

The battery charger 104 may operate in the constant current charge mode of operation 302 when the voltage of the battery 106 is greater than minimum charge voltage 350 and less than or substantially equal to a constant charge voltage 352. In the constant charge mode of operation 302, the battery charger 104 provides the battery charging current 154, or an average battery charging current 154, having a constant current based upon the collapsed power.

The battery charger 104 may operate in the constant voltage charge mode of operation 304 when the voltage of the battery 106 is greater than the constant charge voltage 352 and less than or substantially equal to a float voltage 354. In an exemplary embodiment, the constant charge voltage 352 is approximately 50 mV less than the float voltage 354. In the constant voltage charge mode of operation 304, the battery charger 104 provides a constant charge voltage, or a constant average charge voltage, based upon the collapsed power.

Those skilled in the relevant art(s) will recognize that the examples of the minimum charge voltage 350, the constant current charge voltage 352, and/or the float voltage 354 are for illustrative purposes only. Those skilled in the relevant art(s) may implement other minimum charge voltages, other constant current charge voltages, and/or other float voltages differently in accordance with the teachings herein without departing from the spirit and scope of the present invention.

Herein, the voltage of the battery 106 represents the voltage of the battery 106 with the battery charging current 154 being applied, whereas the float voltage of the battery 106 represents the voltage of the battery 106 with no battery charging current 154 being applied. More specifically, the battery 106 may include an effective resistance referred to as an equivalent series resistance (ESR). The battery charging current 154 may produce an ESR voltage across the ESR of the battery 106 that causes the charge voltage to differ from the float voltage 354.

Referring again to FIG. 1, the battery 106 may include one or more nickel-cadmium (NiCd), one or more nickel metal hydride (NiMH), and/or one or more lithium-ion (Li-ion) cells. However, this example is not limiting, those skilled in the relevant art(s) may implement the battery 106 using other battery chemistries without departing from the scope and spirit of the present invention. The one or more cells of the battery 106 convert chemical energy into electrical energy via an electrochemical reaction. The battery charging current 154 may reverse the electrochemical reaction allowing the battery 106 to be restored or recharged.

Figure 4:
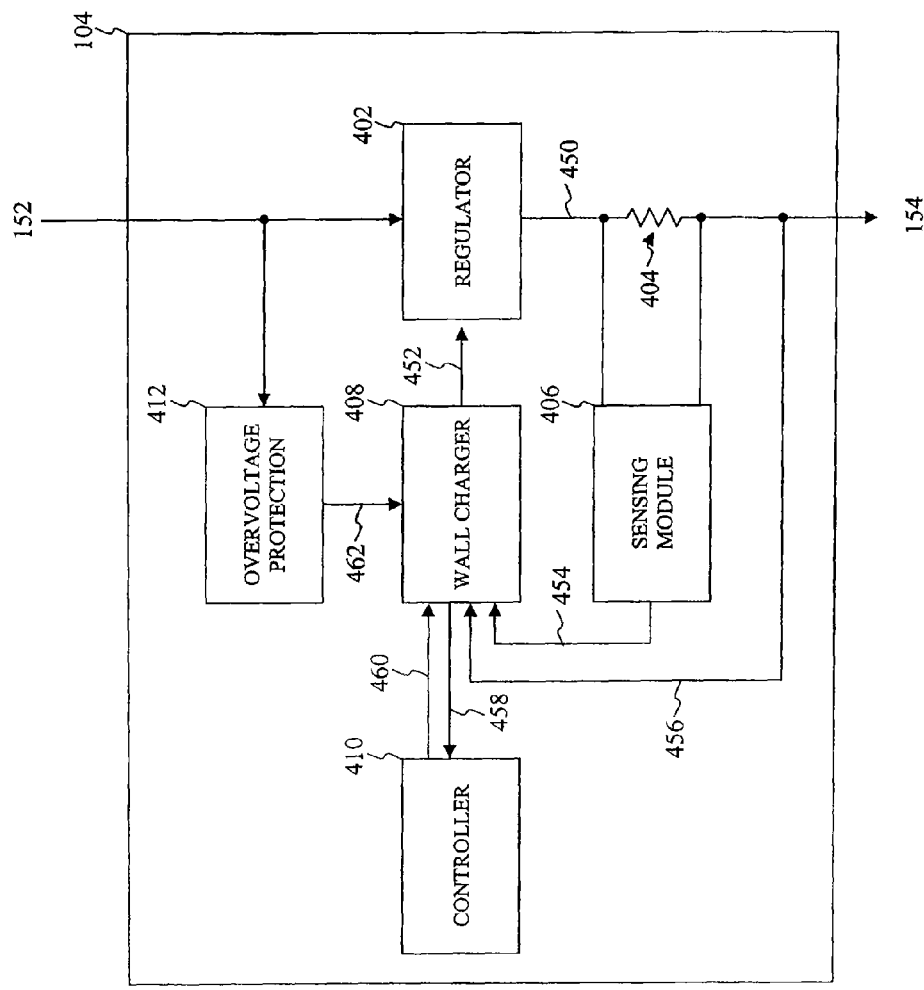
FIG. 4 illustrates a block diagram of the battery charger used in the charging environment according to an exemplary embodiment of the present invention.

FIG. 4 illustrates a block diagram of the battery charger used in the charging environment according to an exemplary embodiment of the present invention. The battery charger 104 includes a regulator module 402, a sensing resistor 404, a sensing module 406, a wall charger module 408, a controller module 410, and an overvoltage protection module 412.

The regulator module 402 provides a battery charging voltage and/or current 450 based upon the DC power 152. More specifically, the regulator module 402 regulates the DC power 152 based upon a regulator control 452. The regulator control 452 may cause the regulator module 402 to provide the battery charging voltage and/or current 450. Alternatively, the regulator control 452 may cause the regulator module 402 not to provide the battery charging voltage and/or current 450.

The sensing resistor 404 provides the battery charging current 154 based upon the battery charging voltage and/or current 450. More specifically, the sensing resistor 404 converts the battery charging voltage and/or current 450 into the battery charging current 154. The sensing resistor 404 has a small value such that power dissipated across the sensing resistor 404 is minimal. In an exemplary embodiment, the sensing resistor 404 is implemented as a 0.1Ω precision resistor.

The sensing module 406 provides the wall charger 408 with a sensed voltage 454 based upon the battery charging current 154. More specifically, the sensing module 406 determines a voltage differential across the sensing resistor 404. The sensing module 406 provides the voltage differential across the sensing resistor 404 as the sensed voltage 454.

The wall charger 408 provides the regulator control 452 based upon a voltage of the battery 106 via a battery voltage 456, and/or the battery charging current 154 via the sensed voltage 454 from the sensing module 406.

In the constant current charge mode of operation 302, the wall adapter 102 provides the battery charger 104 with the collapsed power. The wall charger 408 provides the regulator control 452 that causes the regulator module 402 to provide the battery charging current 154, or an average battery charging current 154, having the constant current using the collapsed power. The regulator module 402 provides the battery charging current 154 having the constant current until the battery voltage 456 is substantially equal to the constant charge voltage 352.

In the constant voltage charge mode of operation 304, the wall adapter 102 provides the battery charger 104 with the collapsed power. The wall charger 408 provides the regulator control 452 that causes the regulator module 402 to provide a constant charge voltage, or a constant average charge voltage, using the collapsed power. The regulator module 402 provides the battery charging voltage and/or current 450 having the constant voltage until the battery voltage 456 is substantially equal to the float voltage 354.

The wall charger 408 may additionally provide one or more indicators 458 based upon the battery voltage 456 and/or the sensed voltage 454. The controller module 410 provides a current enable 460 based upon the one or more indicators 458. As will be understood by those skilled in the relevant art(s) from the teachings provided herein, the controller module 410 may be readily implemented in hardware, software, or a combination of hardware and software. For example, based upon the teachings provided herein, those skilled in the relevant art(s) could implement the controller module 410 via a combination of at least one application specific integrated circuit and a processor core for implementing software commands stored in at least one attached memory. However, this example is not limiting, and other implementations are within the scope and spirit of the present invention.

The current enable 460 may cause the wall charger 408 to adjust the battery charging current 154 based upon the one or more indicators 458. For example, the one or more indicators 458 may indicate one or more of: the battery charging current 154 is less than a minimum current $I_{MIN}$, the current enable 460 is to cause the regulator module 402 to provide the battery charging voltage and/or current 450, the current enable 460 is to cause the regulator module 402 not to provide the battery charging voltage and/or current 450, and/or a mode of operation of the wall adapter 102 to provide some examples. The controller module 410 may cause the regulator module 402 to increase and/or to decrease the battery charging voltage and/or current 450 and/or the controller module 410 may cause the regulator module 402 not to provide the battery charging voltage and/or current 450 to provide some examples in response to the current enable 460.

The overvoltage protection module 412 provides a DC power indicator 462 based upon the DC power 152. When the DC power 152 is greater than or substantially equal to a predetermined maximum voltage, the overvoltage protection module 412 provides the DC power indicator 462 indicative of an existence of an overvoltage condition. The wall charger 408 provides the regulator control 452 that causes the regulator module 402 not to provide the battery charging voltage and/or current 450. Alternatively, the DC power 152 is less than the predetermined maximum voltage. The overvoltage protection module 412 provides the DC power indicator 462 indicative of a non-existence of the overvoltage condition. The wall charger 408 provides the regulator control 452 that causes the regulator module 402 to provide the battery charging voltage and/or current 450.

Figure 5:
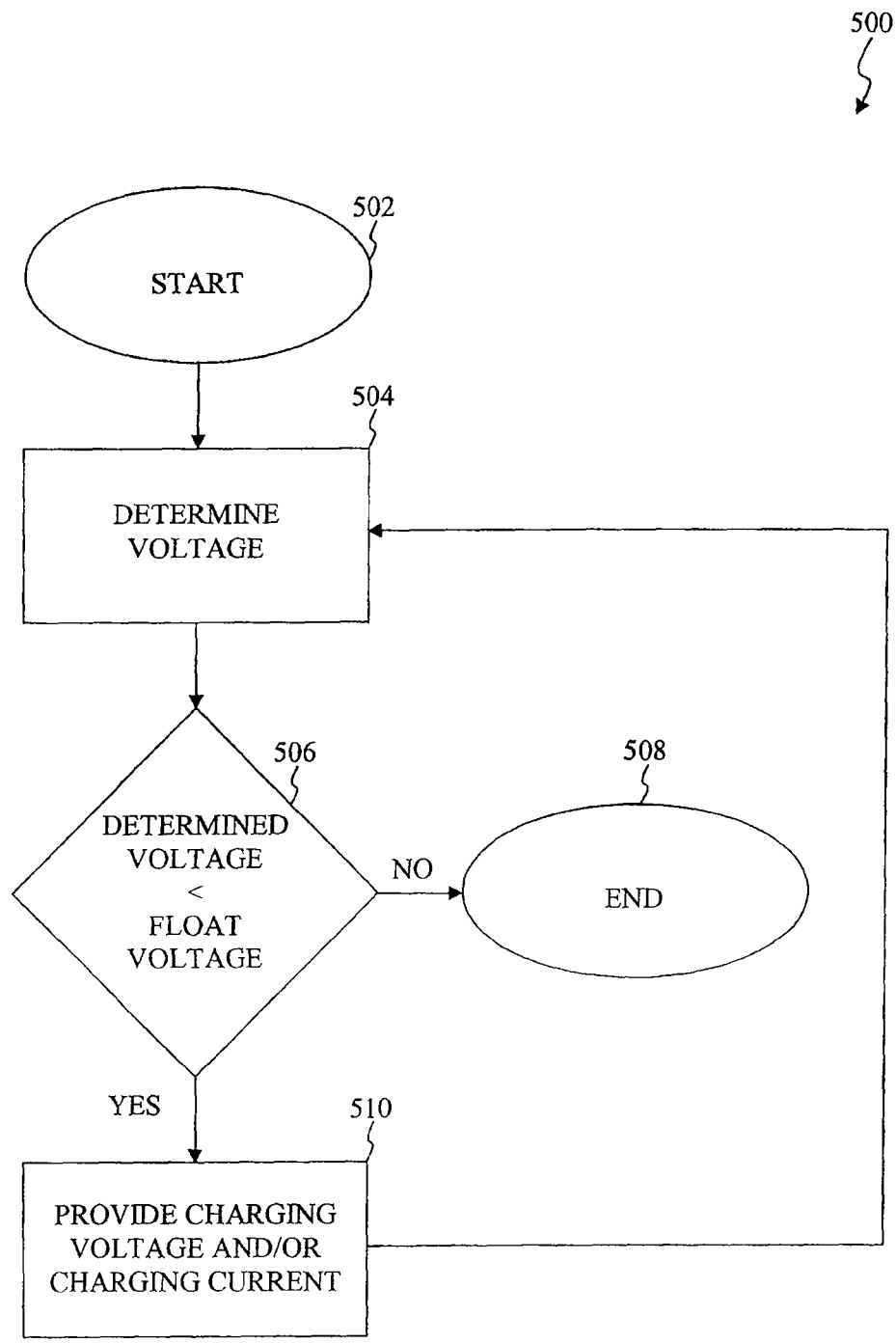
FIG. 5 is a flowchart of exemplary operational steps of the battery charger used in the charging environment according to an aspect of the present invention.

FIG. 5 is a flowchart 500 of exemplary operational steps of the battery charger used in the charging environment according to an aspect of the present invention. Rather, it will be apparent to persons skilled in the relevant art(s) from the teachings herein that other operational control flows are within the scope and spirit of the present invention. The following discussion describes the steps in FIG. 5.

At step 502, the operational control flow proceeds to step 504.

At step 504, the operational control flow determines a voltage of a battery, such as the battery 106 to provide an example.

At step 506, the operational control flow determines whether the voltage of step 504 is less than a float voltage, such as the float voltage 354 to provide an example. If the voltage of step 504 is less than the float voltage of the battery, the operational control flow proceeds to step 510. Else, the voltage of step 504 is not less than the float voltage of the battery, the operational control flow proceeds to step 508

At step 508, the operational control flow ends.

At step 510, the operational control flow provides a charging current. The operational control flow may provide the charging current in one or more of: a constant current charge mode of operation, such as the constant current charge mode of operation 302 to provide an example, and/or a constant voltage charge mode of operation, such as the constant voltage charge mode of operation 304.

When operating in the constant current charge mode of operation, the operational control flow causes the wall adapter to provide a collapsed power, such as the collapsed power as described in FIG. 2 to provide an example. The operational control flow provides the charging current having a constant current until the voltage of the battery is less than or substantially equal to a constant charge voltage, such as the constant charge voltage 352.

Alternatively, when operating in the constant voltage charge mode of operation, the operational control flow causes the wall adapter to provide the collapsed power. The operational control flow provides the charging voltage having a constant voltage until the voltage of the battery is less than or substantially equal to a float voltage, such as the float voltage 354.

FIG. 6 further illustrates the block diagram of the battery charger used in the charging environment according to an exemplary embodiment of the present invention. From the discussion above, the battery charger 104 includes the regulator module 402, the sensing resistor 404, the sensing module 406, the wall charger module 408, the controller module 410, and the overvoltage protection module 412.

The regulator module 402 provides the battery charging voltage and/or current 450 based upon the DC power 152. In an exemplary embodiment, the regulator module 402 includes a PNP device 602. Current passes through an emitter of the PNP device 602 to a collector of the PNP device when a base of the PNP device, via the regulator control 452, is less than or substantially equal to a threshold of the PNP device 602. Alternatively, no current passes to the collector of the PNP device from the emitter of the PNP device 602 when the base of the PNP device 602 is greater than the threshold of the PNP device 602. However, this example is not limiting, those skilled in the relevant art(s) may implement the regulator module 402 using a NPN device differently in accordance with the teachings herein without departing from the spirit and scope of the present invention.

The sensing module 406 provides the wall charger 408 with the sensed voltage 454 based upon the battery charging current 154. The sensing module 406 includes a first amplifier 604, a second amplifier 606, and a multiplexer 608. The first amplifier 604 amplifies the voltage differential across the sensing resistor 404 by a first gain $g_1$ to provide a first intermediate sensed voltage 650. In an exemplary embodiment, the first amplifier 604 amplifies the voltage differential across the sensing resistor 404 by eight. The second amplifier 606 amplifies the first intermediate sensed voltage 650 by a second gain $g_2$ to provide a second intermediate sensed voltage 652. In another exemplary embodiment, the second amplifier 606 amplifies the first intermediate sensed voltage 650 by five. The multiplexer 608 provides either the first intermediate sensed voltage 650 or the second intermediate sensed voltage 652 as the sensed voltage 454 based upon a sensed voltage control 654. The sensed voltage control 654 may be provided by the controller module 410 or by any other suitable means that will be apparent to those skilled in the relevant art(s).

The wall charger 408 provides the regulator control 452 based upon the voltage of the battery 106 via a battery voltage 456, the battery charging current 154 via the sensed voltage 454 from the sensing module 406, and/or the current enable 460. The wall charger 408 includes a regulator control module 610, a reference voltage module 612, a current modulating comparator 614, a current control integrator 616, an under current comparator 618, and a mode of operation comparator 620.

The regulator control module 610 provides the regulator control 452 based upon a current control 670 and/or a base current limit 672. The regulator control module 610 includes a switching device 624. The switching device 624 provides a regulator potential 658 as the regulator control 452 based upon the base current limit 672 and the current control 670. The base current limit 672 places a limitation on the regulator potential 658. For example, a greater base current limit 672 allows more of the regulator potential 658 to be provided by the regulator control module 610 when compared to a lesser base current limit 672. In this example, the greater base current limit 672 causes a greater battery charging current 154 when compared to the lesser base current limit 672. The base current limit 672 may be provided by the controller module 410 or by any other suitable means that will be apparent to those skilled in the relevant art(s). In an exemplary embodiment, the regulator potential 658 corresponds to a ground potential. In this exemplary embodiment, the regulator control module 610 sinks current from the battery regulator 402. However, this example is not limiting, those skilled in the relevant art(s) will recognize that the regulator potential 658 may correspond to any suitable potential that may source and/or sink current from the regulator control module 610 without departing from the spirit and scope of the present invention.

The switching device 624 includes a current modulating device 626 and a current control device 628 configured to operate as a logical conjunction or AND gate. However, this example is not limiting, those skilled in the relevant art(s) may implement the switching device 624 to operate as any other suitable logical operation differently in accordance with the teachings herein without departing from the spirit and scope of the present invention. For example, the switching device 624 may be configured to operate as a logical disjunction or OR gate.

The current modulating device 626 and/or the current control device 628 may be implemented using NMOS devices. However, this example is not limiting, those skilled in the relevant art(s) may implement the current modulating device 626 and a current control device 628 as PMOS devices differently in accordance with the teachings herein without departing from the spirit and scope of the present invention. The switching device 624 provides the regulator potential 658 when the base current limit 672 exceeds a threshold of the current modulating device 626 and the current control 670 exceeds a threshold of the current modulating device 626. Alternatively, the switching device 624 does not provide the regulator potential 658 when the base current limit 672 does not exceed the threshold of the current modulating device 626 and/or the current control 670 does exceed the threshold of the current modulating device 626.

The regulator control module 610 may receive the DC power indicator 462 from the overvoltage protection module 412. More specifically, the regulator control module 610 does not provide the regulator control 452 when the DC power indicator 462 indicates the existence of the overvoltage condition. In an exemplary embodiment, the DC power indicator 462 causes the current control 670 not to exceed the threshold of the current modulating device 626. Alternatively, the regulator control module 610 may provide the regulator control 452 when the DC power indicator 462 indicates the non-existence of the overvoltage condition.

The reference module 612 provides a fractional reference 660 corresponding to a fraction of the battery voltage 456. The reference module 612 includes a series resistor 630 and a shunt resistor 632 configured to operate as a voltage dividing circuit. However, this example is not limiting, those skilled in the relevant art(s) will recognize that the reference module 612 may include any combination of elements such as resistors, inductors, and/or capacitors without departing from the spirit and scope of the present invention. In an exemplary embodiment, the reference module 612 is optional. In this exemplary embodiment, the battery voltage 456 may be directly provided to the current control integrator 616.

The current modulating comparator 614 provides a current modulating indicator 458.1 based upon the fractional reference 660 and a current modulating reference 662. A current modulating reference generator 636 may provide the current modulating reference 662 based upon a reference control 460.2.

FIG. 7A illustrates a current modulating reference generator used in the battery charger according to an exemplary embodiment of the present invention. The current modulating reference generator 636 includes a digital to analog converter (DAC) 702 and a combination module 704. The DAC 702 may be included in the controller module 410 to provide an example. The DAC 702 is configured to receive the reference control 460.2 having N bits, corresponding to $2^N$ levels. The DAC 702 provides a ramp signal 752 based upon the reference control 460.2.

FIG. 7B illustrates a ramp signal used in the battery charger according to an exemplary embodiment of the present invention. However, this example is not limiting, the ramp signal 752 as demonstrated in FIG. 7B is for illustrative purposes only. Those skilled in the relevant art(s) may implement other signals differently in accordance with the teachings herein without departing from the spirit and scope of the present invention.

As shown in FIG. 7B, the ramp signal 752 includes one or more ramp pulses 754.1 through 754.K. Each ramp pulse from the one or more ramp pulses 754 includes $2^N$ output levels 756. The DAC 702 incrementally steps through the $2^N$ output levels 756 in a continuous manner to provide the ramp signal 752. More specifically, the reference control 460.2 is continuously incrementally increased from a minimum control word to a maximum control word to cause the DAC 702 to provide a ramp having a minimum corresponding to a first output level 756.1 and a maximum corresponding to a $2^{N\text{-}th}$ output level. For example, the first output level 756.1 of a corresponding ramp pulse 754 corresponds to a first voltage of $$\frac{\Delta}{2^N},$$

where Δ represents a difference between the float voltage 354 and the constant charge voltage 352, for a duration $$\frac{t}{2^N}$$

seconds. Likewise, a second output level 756.2 of the corresponding ramp pulse 754 corresponds to a second voltage of $$2 * \frac{\Delta}{2^N}$$

for the duration of $$\frac{t}{2^N}$$

seconds. Similarly, the $2^{N\text{-}th}$ output level 756.$2^N$ of the corresponding ramp pulse 754 corresponds to a $2^{N\text{-}th}$ voltage of Δ for $$\frac{t}{2^N}$$

the duration of seconds for a total duration of t seconds for the corresponding ramp pulse 754. In an exemplary embodiment, each ramp pulse from the one or more ramp pulses 754 includes sixteen levels 756.1 through 756.16 having the total duration of one second.

Referring again to FIG. 7A, the combination module 704 combines the ramp signal 752 and a voltage offset 760 to provide the current modulating reference 662. The voltage offset 760 may represent the constant charge voltage 352 and/or any other suitable offset voltage that will be apparent to those skilled in the relevant art(s). In an exemplary embodiment, the combination module 704 is optional. In this exemplary embodiment, the ramp signal 752 may be directly provided to the current modulating comparator 614.

Referring again to FIG. 6, the current modulating comparator 614 provides the current modulating indicator 458.1 based upon the fractional reference 660 and the current modulating reference 662.

FIG. 8 illustrates an operation of a current modulating comparator used in the battery charger according to an exemplary embodiment of the present invention. However, this example is not limiting, the operation of the current modulating comparator as demonstrated in FIG. 8 is for illustrative purposes only. Those skilled in the relevant art(s) may operate the current modulating comparator differently in accordance with the teachings herein without departing from the spirit and scope of the present invention.

At reference crossing points 802.1 through 802.3 the current modulating reference 662 is substantially equal to the fractional reference 660. More specifically, the current modulating reference 662 is greater than the fractional reference 660 until the reference crossing point 802.1. At the reference crossing point 802.1, the current modulating reference 662 is substantially equal to the fractional reference 660. After the reference crossing point 802.1, the fractional reference 660 is greater than the current modulating reference 662 until the reference crossing point 802.2. Likewise, at the reference crossing point 802.2 the current modulating reference 662 is substantially equal to the fractional reference 660. After the reference crossing point 802.2, the current modulating reference 662 is greater than the fractional reference 660 until the reference crossing point 802.3. Similarly, at the reference crossing point 802.3 the current modulating reference 662 is substantially equal to the fractional reference 660. After the reference crossing point 802.3, the fractional reference 660 is greater than the current modulating reference 662. However, this example is not limiting, those skilled in the relevant art(s) will recognize that the enlargement 800 may include a greater number or a lesser number of reference crossing points 802 without departing from the spirit and scope of the present invention.

At the reference crossing points 802.1 through 802.3, there is no substantial difference between the fractional reference 660 and the current modulating reference 662. As a result, the current modulating comparator 614 provides the current modulating indicator 458.1 indicative of an existence of no substantial difference between the fractional reference 660 and the current modulating reference 662. Alternatively, at points other than the reference crossing points 802.1 through 802.3, there is a difference between the fractional reference 660 and the current modulating reference 662. As a result, the current modulating comparator 614 provides the current modulating indicator 458.1 indicative of an existence of the difference between the fractional reference 660 and the current modulating reference 662.

The current modulating comparator 614 may provide a first current modulating indicator 458.1 indicative of the existence of the difference between the fractional reference 660 and the current modulating reference 662. When there is no substantial difference between the fractional reference 660 and the current modulating reference 662, the current modulating comparator 614 may provide a second current modulating indicator 458.1 indicative of the existence of no substantial difference between the fractional reference 660 and the current modulating reference 662. The current modulating comparator 614 selects or switches between the first current modulating indicator 458.1 and the second current modulating indicator 458.1 based upon the difference between the fractional reference 660 and the current modulating reference 662.

Referring again to FIG. 6, the current control integrator 616 provides the current control 670 based upon the sensed voltage 454 and a constant current reference 664. A constant current reference module 638 may provide the constant current reference 664 based upon the current enable 460.1. The constant current reference module 638 may includes a constant current reference generator 634 and a slew control module 622.

The constant current reference generator 634 may provide a constant current reference 656 based upon the current enable 460.1. In an exemplary embodiment, the constant current reference generator 634 provides the constant current reference 664 sufficiently large to cause the wall adapter 102 to operate in the collapsed mode of operation. The slew control module 622 provides the constant current reference 664 based upon the constant current reference 656. More specifically, the slew control module 622 decreases a maximum rate of change of the constant current reference 656. In an exemplary embodiment, the slew control module 622 is optional. In this exemplary embodiment, the constant current reference 656 may be directly provided by the constant current reference module 638. The current control integrator 616 compares the sensed voltage 454 and the constant current reference 664. The current control integrator 616 integrates a difference between the sensed voltage 454 and the constant current reference 664 to provide the current control 670. A greater integrated difference between the sensed voltage 454 and the constant current reference 664 causes a greater battery charging current 154 when compared to integrated difference between the sensed voltage 454 and the constant current reference 664 allowing the current control integrator 616 to regulate or to control the battery charging current 154.

The under current comparator 618 provides an under current indicator 458.2 based upon the sensed voltage 454 and an under current voltage reference 668. More specifically, the under current comparator 618 compares the sensed voltage 454 and the under current voltage reference 668. When the sensed voltage 454 is less than the under current voltage reference 668, the under current comparator 618 provides the under current indicator 458.2 indicative of an existence of an under current condition. Alternatively, the sensed voltage 454 is greater than or substantially equal to the under current voltage reference 668. The under current comparator 618 provides the under current indicator 458.2 indicative of a non-existence of the under current condition.

The mode of operation comparator 620 provides a mode of operation indicator 458.3 based upon the DC power 152 and the battery charging voltage and/or current 450. More specifically, the mode of operation comparator 620 compares the DC power 152 and the battery charging voltage and/or current 450 to provide the mode of operation indicator 458.3. When a difference between the DC power 152 and the battery charging voltage and/or current 450 is less than to a predetermined maximum difference, the mode of operation comparator 620 provides the mode of operation indicator 458.3 indicative of an existence of the wall adapter 102 operating in the collapsed mode of operation. Alternatively, the difference between the DC power 152 and the battery charging voltage and/or current 450 is substantially greater than or equal to the predetermined maximum difference. The mode of operation comparator 620 provides the mode of operation indicator 458.3 indicative of an existence of the wall adapter 102 operating in the nominal mode of operation.

The controller module 410 provides the current enable 460.1 and/or the reference control 460.2 based upon the one or more indicators 458.1 through 458.3. For example, the controller module 410 may cause the regulator module 402 not to provide the battery charging voltage and/or current 450 and/or cause the regulator module 402 to provide the battery charging voltage and/or current 450 in based upon the current modulating indicator 458.1. The controller module 410 may cause the regulator module 402 not to provide the battery charging voltage and/or current 450 for a greater or lesser duration in time when compared the regulator module 402 providing the battery charging voltage and/or current 450 to pulse width modulate the battery charging current 154.

FIG. 9 illustrates an operation of the controller module used in the battery charger according to an exemplary embodiment of the present invention. The current modulating reference 662 includes ramp pulses $p_1$ through $p_8$. However, this example is not limiting, those skilled in the relevant art(s) may implement a greater number or a lesser number of ramp pulses differently in accordance with the teachings herein without departing from the spirit and scope of the present invention.

For a duration of ramp pulse $p_1$ and a duration ramp pulse $p_2$, the controller module 410 operates in the constant current charge mode of operation 302. In the constant voltage charge mode of operation 304, the fractional reference 660 is substantially greater than the current modulating reference 662. The current modulating comparator 614 provides the first current modulating indicator 458.1 indicative of the existence of the difference between the fractional reference 660 and the current modulating reference 662. The controller module 410 provides the current control 460.1 that causes the regulator module 402 to provide the battery charging voltage and/or current 450. As a result, the battery charging current 154 is provided to the battery 106.

At charging time 900, the battery voltage 456 corresponds to the battery voltage 456 being greater than or equal to the constant charge voltage 352. The controller module 410 operates in the constant voltage charge mode of operation 304 for a duration of ramp pulse $p_3$ through duration ramp pulse $p_8$.

At the charging time 900, the current modulating comparator 614 provides the second current modulating indicator 458.1 indicative of the existence of the no substantial difference between the fractional reference 660 and the current modulating reference 662 for a duration of $\Delta_1$ of ramp pulse $p_3$. The controller module 410 provides the current control 460.1 that causes the regulator module 402 not to provide the battery charging voltage and/or current 450. As a result, the battery charging current 154 is not provided to the battery 106.

After the duration of $\Delta_1$, the current modulating reference 662 is substantially equal to the fractional reference 660 at reference crossing point 802.1. The current modulating comparator 614 provides the first current modulating indicator 458.1 indicative of the existence of the difference between the fractional reference 660 and the current modulating reference 662. The controller module 410 provides the current control 460.1 that causes the regulator module 402 to provide the battery charging voltage and/or current 450. As a result, the battery charging current 154 is provided to the battery 106.

At charging time 902.1, corresponding to an end of the ramp pulse $p_3$, the controller module 410 provides the current control 460.1 that causes the battery regulator 402 not to provide the battery charging voltage and/or current 450. As a result, no battery charging current 154 is provided to the battery 106.

After the duration of $\Delta_2$, the current modulating reference 662 is substantially equal to the fractional reference 660 at reference crossing point 802.1. The current modulating comparator 614 provides the first current modulating indicator 458.1 indicative of the existence of the difference between the fractional reference 660 and the current modulating reference 662. The controller module 410 provides the current control 460.1 that causes the regulator module 402 to provide the battery charging voltage and/or current 450. As a result, the battery charging current 154 is provided to the battery 106.

The controller module 410 proceeds in a similar manner with pulses $p_4$ through $p_7$, whereby the controller module 410 provides the current control 460.1 that causes the battery regulator 402 not to provide the battery charging voltage and/or current 450 for a corresponding duration of $\Delta_3$ through $\Delta_5$ of ramp pulses $p_4$ through $p_7$. More specifically, the controller module 410 provides the current control 460.1 that causes the battery regulator 402 not to provide the battery charging voltage and/or current 450 at corresponding reference crossing point 802.2 through 802.5 until reaching a corresponding charging time 902.2 through 902.5 whereby the controller module 410 provides the current control 460 that causes the battery regulator 402 to provide the battery charging voltage and/or current 450. After a duration of ramp pulse $p_7$, the current modulating reference 662 remains substantially less than the sensed voltage 454. As a result, the battery voltage 456 of the battery 106 is substantially equal to the float voltage 354.

A duration of a corresponding $\Delta$ is less than a duration of a corresponding next $\Delta$. For example, the duration of $\Delta_1$ is less than the duration of $\Delta_2$ causing the battery charging current 154 to be provided to the battery 106 for a longer duration in time for the pulse $p_3$ as compared to the pulse $p_4$. As a result, the controller module 410 causes less battery charging current 154 to be provided to the battery 106 during for the duration of the corresponding $\Delta$ when compared to the duration of the corresponding next $\Delta$ to pulse width modulate the battery charging current 154.

Referring again to FIG. 6, as an additional example, when the under current indicator 458.2 indicates the existence of the under current condition, the controller module 410, in response to the under current indicator 458.2, provides the current control 460.1 that causes the battery regulator not to provide the battery charging voltage and/or current 450. In this situation, the DC power 152 provided by the wall adapter 102 is unable to restore or recharge the battery 106.

As another example, when the mode of operation indicator 458.3 indicates the existence of wall adapter 102 operating in the collapsed mode of operation, the controller module 410, in response to the mode of operation indicator 458.3, provides the current control 460.1 that causes the battery regulator to provide the battery charging voltage and/or current 450. Alternatively, when the mode of operation indicator 458.3 indicates the existence of wall adapter 102 operating in the nominal mode of operation, the controller module 410, in response to the mode of operation indicator 458.3, provides the current control 460.1 that causes the battery regulator not to provide the battery charging voltage and/or current 450.

CONCLUSION

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based upon the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A battery charger for regulating an input power, the input power being in one of a nominal state or a collapsed state, comprising:
    a regulator module configured to regulate the input power while in the collapsed state based upon a regulator control to provide a battery charging current;
    a sensing module configured to provide a sensed voltage based upon the battery charging current;
    a wall charger module configured to provide an indicator based upon the sensed voltage and to provide the regulator control based upon a current enable; and
    a controller module configured to provide the current enable based upon the indicator,
    wherein the regulator module does not actively transition the input power from the collapsed state to the nominal state.

2. The battery charger of claim 1, wherein the regulator module includes a PNP device.

3. The battery charger of claim 1, further comprising:
    a sensing resistor configured to provide a voltage differential based upon the battery charging current,
    wherein the sensing module is further configured to provide the sensed voltage based upon the voltage differential.

4. The battery charger of claim 1, wherein the wall charger module is further configured to provide the regulator control that causes the battery charging current to be a substantially constant current when a voltage of the battery is substantially less than or equal to a constant charge voltage.

5. The battery charger of claim 4, wherein the regulator module is further configured to adjust the battery charging current in response to the voltage of the battery to provide the substantially constant current.

6. The battery charger of claim 1, wherein the wall charger module is further configured to provide the regulator control that causes a voltage of a battery to be a substantially constant voltage when the voltage of the battery is substantially less than or equal to a float voltage.

7. The battery charger of claim 6, wherein the regulator module is further configured to adjust the battery charging current in response to the voltage of the battery to provide the substantially constant voltage.

8. The battery charger of claim 6, wherein the regulator module is further configured to pulse width modulate the battery charging current to provide the substantially constant voltage.

9. The battery charger of claim 1, wherein the wall charger module comprises:
   a current control integrator configured to provide a current control based upon the sensed voltage and a constant current reference; and
   a regulator control module configured to provide the regulator control based upon the current control.

10. The battery charger of claim 9, wherein the current control integrator is further configured to compare the sensed voltage and the constant current reference and to integrate a difference between the sensed voltage and the constant current reference to provide the current control.

11. The battery charger of claim 9, wherein the regulator control module comprises:
    a switching device configured to provide the regulator control based upon the current enable and a base current limit.

12. The battery charger of claim 11, wherein the switching device comprises:
    a first switching device configured to receive the current enable; and
    a second switching device configured to receive the base current limit,
    wherein the first switching device and the second switching device are configured to operate as a logical conjunction.

13. The battery charger of claim 1, wherein the wall charger module comprises:
    a current modulating comparator configured to provide a current modulating indicator based upon a battery voltage and a current modulating reference; and
    a regulator control module configured to provide the regulator control based upon the current modulating indicator.

14. The battery charger of claim 13, further comprising:
    a current modulating reference generator configured to provide the current modulating reference based upon a reference control.

15. The battery charger of claim 14, wherein the current modulating reference generator comprises:
    a digital to analog converter (DAC), having a plurality of output levels, configured to incrementally step through the plurality of output levels to produce a ramp pulse to provide the current modulating reference.

16. The battery charger of claim 14, wherein the current modulating reference generator comprises:
    a digital to analog converter (DAC) configured to produce a ramp pulse based upon the reference control.

17. The battery charger of claim 13, wherein the current modulating comparator is further configured to provide the current modulating indicator indicating an existence of no substantial difference between the battery voltage and the current modulating reference when the sensed voltage is substantially equal to the current modulating reference.

18. The battery charger of claim 13, wherein the current modulating comparator is further configured to provide the current modulating indicator indicating an existence of a substantial difference between the battery voltage and the current modulating reference when the sensed voltage is not substantially equal to the current modulating reference.

19. The battery charger of claim 13, wherein the current modulating comparator is further configured to provide a first current modulating indicator when the battery voltage is substantially equal to the current modulating reference and a second current modulating indicator when the battery voltage is substantially equal to the current modulating reference,
    wherein the current modulating comparator is further configured to select between the first current modulating indicator and the second current modulating indicator based upon a difference between the battery voltage and the current modulating reference.

20. The battery charger of claim 1, wherein the indicator is indicative of conditions comprising:
    the battery charging current being less than a minimum current;
    the current enable enabling the regulator module to provide the battery charging current;
    the current enable disabling the regulator module from providing the battery charging current;
    the input power being in the nominal state; and
    the input power being in the collapsed state.

21. The battery charger of claim 1, wherein the regulator module is further configured to regulate the input power in the nominal state based upon the regulator control to provide the battery charging current.

22. The battery charger of claim 1, wherein:
    the nominal state includes a nominal voltage component and a first range of battery charging current components being less than a collapsing current,
    the collapsed state includes a collapsed voltage component and a second range of battery charging current components being greater than the collapsing current,
    the battery charging current is within the first range of battery charging current components while the input power is in the nominal state, and
    the battery charging current is within the second range of battery charging current components while the input power is in the collapsed state.

23. The battery charger of claim 22, wherein the collapsed voltage component is less than the nominal voltage component.

24. The battery charger of claim 1, wherein:
    the input power includes a range of voltage components and a range of battery charging current components,
    the range of voltage components vary between a nominal voltage component and a collapsed voltage component, the collapsed voltage component being less than the nominal voltage component, and
    the battery charging current is within the range of battery charging current components.

25. The battery charger of claim 24, wherein the collapsed voltage component represents a minimum voltage level within the range of voltage components.

26. A battery charger for regulating an input power, the input power being in one of a nominal state or a collapsed state, comprising:
    a regulator module configured to regulate the input power while in the collapsed state based upon a regulator control to provide a battery charging current;
    a sensing module configured to provide a sensed voltage based upon the battery charging current;
    a wall charger module configured to provide an indicator based upon the sensed voltage and to provide the regulator control based upon a current enable;

a controller module configured to provide the current enable based upon the indicator; and a sensing resistor configured to provide a voltage differential based upon the battery charging current, wherein the sensing module is further configured to provide the sensed voltage based upon the voltage differential, and wherein the sensing module comprises:
- a first amplifier configured to amplify the voltage differential by a first gain to provide a first intermediate sensed voltage;
- a second amplifier configured to amplify the first intermediate sensed voltage by a second gain to provide a second intermediate sensed voltage; and
- a multiplexer configured to provide the first intermediate sensed voltage or the second intermediate sensed voltage as the sensed voltage.

27. A system, comprising:
a wall adapter configured to operate in a nominal mode of operation and a collapsed mode of operation and to provide an input power, the input power being in a collapsed state in the collapsed mode of operation and in a nominal state in the nominal mode of operation; and a battery charger configured to provide a battery charging current, the battery charger comprising:
- a regulator module configured to regulate the input power while in the collapsed state based upon a regulator control to provide the battery charging current;
- a sensing module configured to provide a sensed voltage based upon the battery charging current;
- a wall charger module configured to provide an indicator based upon the sensed voltage and to provide the regulator control based upon a current enable; and
- a controller module configured to provide the current enable based upon the indicator,
  wherein the regulator module does not actively transition the input power from the collapsed state to the nominal state.

28. The system of claim 27, wherein the regulator module includes a PNP device.

29. The system of claim 27, wherein the battery charger further comprises:
a sensing resistor configured to provide a voltage differential based upon the battery charging current,
wherein the sensing module is further configured to provide the sensed voltage based upon the voltage differential.

30. The system of claim 27, wherein the wall charger module is further configured to provide the regulator control that causes the battery charging current to be a substantially constant current when a voltage of a battery is substantially less than or equal to a constant charge voltage.

31. The system of claim 30, wherein the regulator module is further configured to adjust the battery charging current in response to the voltage of the battery to provide the substantially constant current.

32. The system of claim 27, wherein the wall charger module is further configured to provide the regulator control that causes a voltage of a battery to be a substantially constant voltage when the voltage of the battery is substantially less than or equal to a float voltage.

33. The system of claim 32, wherein the regulator module is further configured to adjust the battery charging current in response to the voltage of the battery to provide the substantially constant voltage.

34. The system of claim 32, wherein the regulator module is further configured to pulse width modulate the battery charging current to provide the substantially constant voltage.

35. The system of claim 27, wherein the wall charger module comprises:
- a current control integrator configured to provide a current control based upon the sensed voltage and a constant current reference; and
- a regulator control module configured to provide the regulator control based upon the current control.

36. The system of claim 35, wherein the current control integrator is further configured to compare the sensed voltage and the constant current reference and to integrate a difference between the sensed voltage and the constant current reference to provide the current control.

37. The system of claim 35, wherein the regulator control module comprises:
a switching device configured to provide the regulator control based upon the current enable and a base current limit.

38. The system of claim 37, wherein the switching device comprises:
- a first switching device configured to receive the current enable; and
- a second switching device configured to receive the base current limit,
wherein the first switching device and the second switching device are configured to operate as a logical conjunction.

39. The system of claim 27, wherein the wall charger module comprises:
- a current modulating comparator configured to provide a current modulating indicator based upon a battery voltage and a current modulating reference; and
- a regulator control module configured to provide the regulator control based upon the current modulating indicator.

40. The system of claim 39, wherein the battery charger further comprises:
a current modulating reference generator configured to provide the current modulating reference based upon a reference control.

41. The system of claim 40, wherein the current modulating reference generator comprises:
a digital to analog converter (DAC) having a plurality of output levels, configured to incrementally step through the plurality of output levels to produce a ramp pulse to provide the current modulating reference.

42. The system of claim 40, wherein the current modulating reference generator comprises:
a digital to analog converter (DAC) configured to produce a ramp pulse based upon the reference control.

43. The system of claim 39, wherein the current modulating comparator is further configured to provide the current modulating indicator indicating an existence of no substantial difference between the battery voltage and the current modulating reference when the sensed voltage is substantially equal to the current modulating reference.

44. The system of claim 39, wherein the current modulating comparator is further configured to provide the current modulating indicator indicating an existence of a substantial difference between the battery voltage and the current modulating reference when the sensed voltage is not substantially equal to the current modulating reference.

45. The system of claim 39, wherein the current modulating comparator is further configured to provide a first current modulating indicator when the battery voltage is substantially equal to the current modulating reference, and a second current modulating indicator when the battery voltage is substantially equal to the current modulating reference, wherein the current modulating comparator is further configured to select between the first current modulating indicator and the second current modulating indicator based upon a difference between the battery voltage and the current modulating reference.

46. The system of claim 27, wherein the indicator is indicative of conditions comprising:

the battery charging current being less than a minimum current;

the current enable enabling the regulator module to provide the battery charging current;

the current enable disabling the regulator module from providing the battery charging current;

the input power being in the nominal state; and the input power being in the collapsed state.

47. The system of claim 27, wherein the regulator module is further configured to regulate the input power in the nominal state based upon the regulator control to provide the battery charging current.

48. The system of claim 27, wherein:

the nominal state includes a nominal voltage component and a first range of battery charging current components being less than a collapsing current, the collapsed state includes a collapsed voltage component and a second range of battery charging current components being greater than the collapsing current, the battery charging current is within the first range of battery charging current components while the input power is in the nominal state, and the battery charging current is within the second range of battery charging current components while the input power is in the collapsed state.

49. The system of claim 48, wherein the collapsed voltage component is less than the nominal voltage component.

50. The system of claim 27, wherein:

the input power includes a range of voltage components and a range of battery charging current components, the range of voltage components vary between a nominal voltage component and a collapsed voltage component, the collapsed voltage component being less than the nominal voltage component, and the battery charging current is within the range of battery charging current components.

51. The system of claim 50, wherein the collapsed voltage component represents a minimum voltage level within the range of voltage components.

52. A system, comprising:

a wall adapter configured to operate in a nominal mode of operation and a collapsed mode of operation and to provide an input power, the input power being in a collapsed state in the collapsed mode of operation and in a nominal state in the nominal mode of operation; and a battery charger configured to provide a battery charging current, the battery charger comprising:

a regulator module configured to regulate the input power while in the collapsed state based upon a regulator control to provide the battery charging current;

a sensing module configured to provide a sensed voltage based upon the battery charging current;

a wall charger module configured to provide an indicator based upon the sensed voltage and to provide the regulator control based upon a current enable;

a controller module configured to provide the current enable based upon the indicator; and a sensing resistor configured to provide a voltage differential based upon the battery charging current, wherein the sensing module is further configured to provide the sensed voltage based upon the voltage differential, and wherein the sensing module comprises:

a first amplifier configured to amplify the voltage differential by a first gain to provide a first intermediate sensed voltage;

a second amplifier configured to amplify the first intermediate sensed voltage by a second gain to provide a second intermediate sensed voltage; and a multiplexer configured to provide the first intermediate sensed voltage or the second intermediate sensed voltage as the sensed voltage.

\* \* \* \* \*